Figure 2:
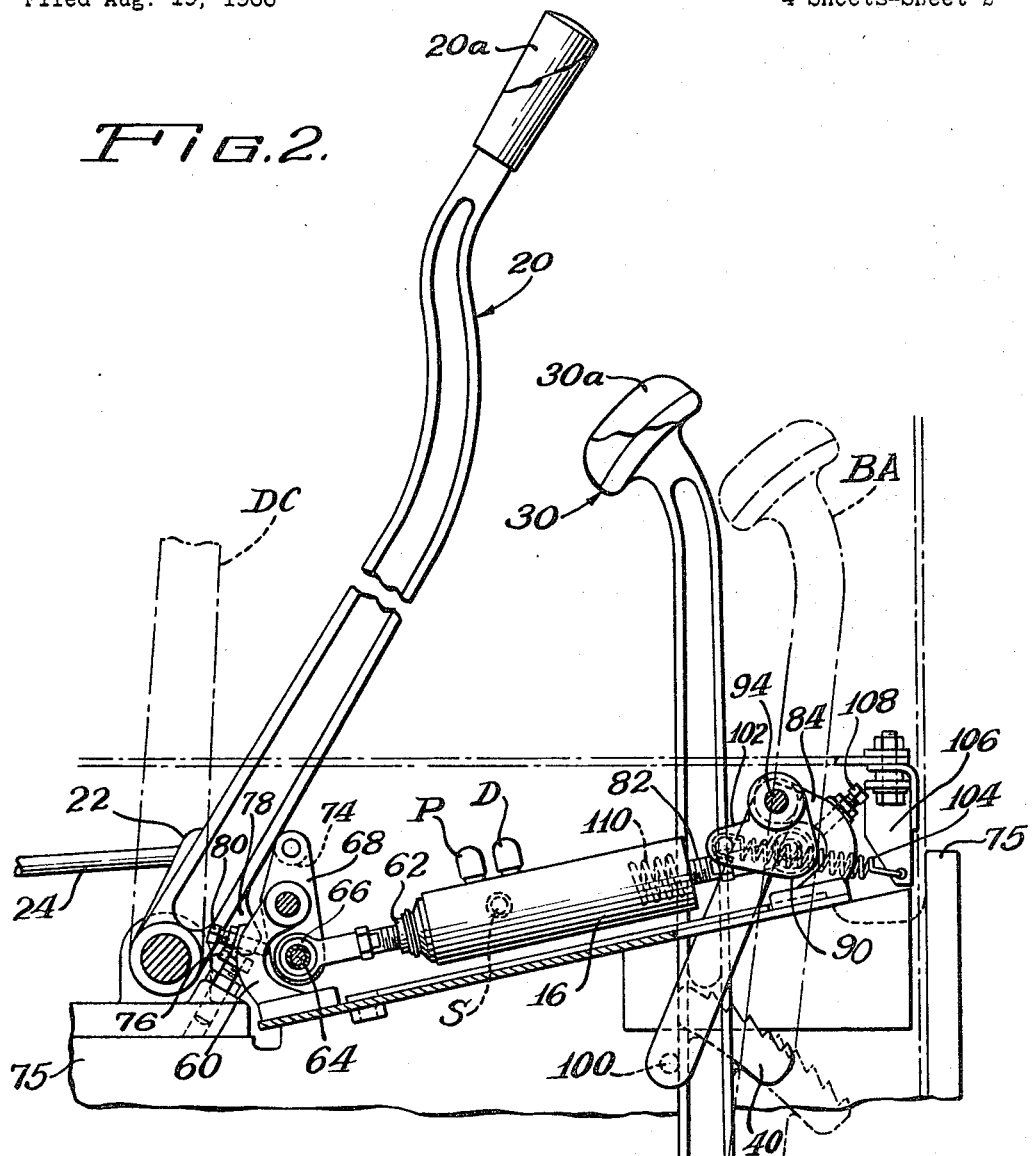

Aug. 27, 1968   C. A. L. RUHL ETAL   3,398,819
MAIN CLUTCH RELEASED BY ENGAGEMENT OF STEERING CLUTCH AND BRAKE
Filed Aug. 19, 1966   4 Sheets-Sheet 1
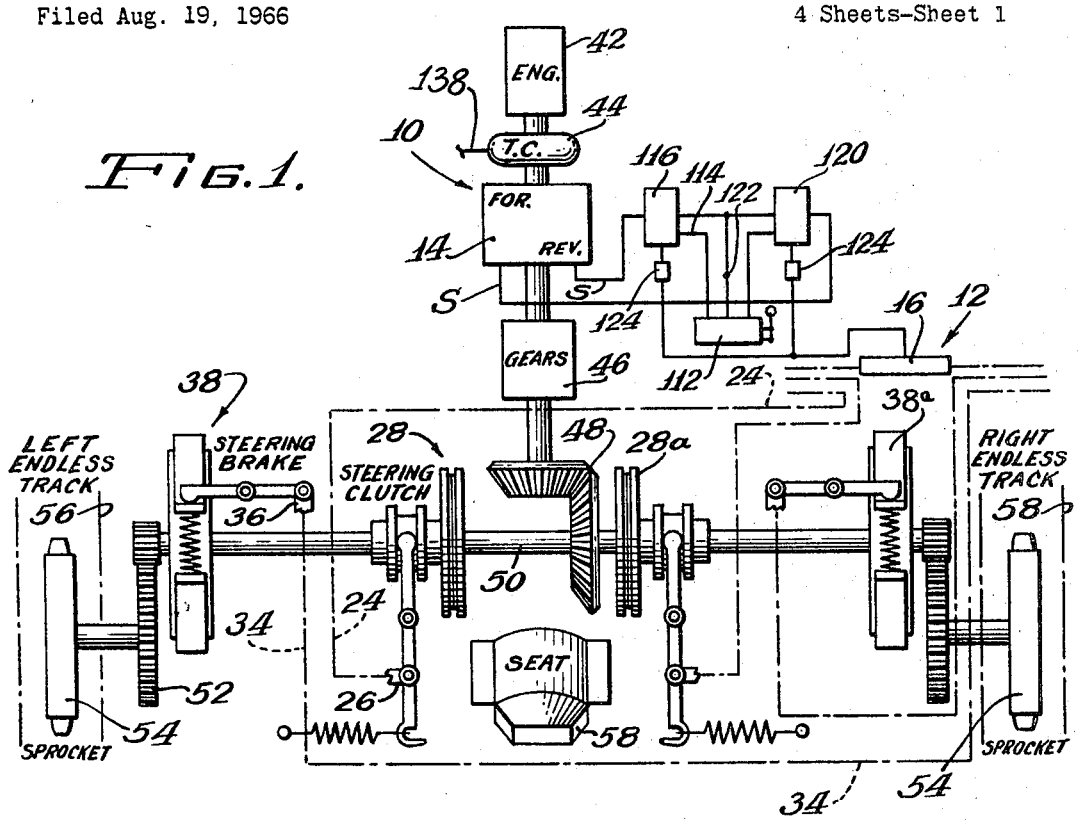
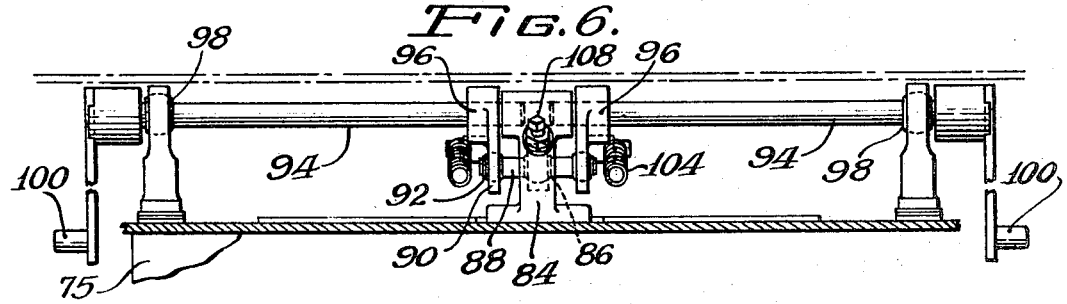
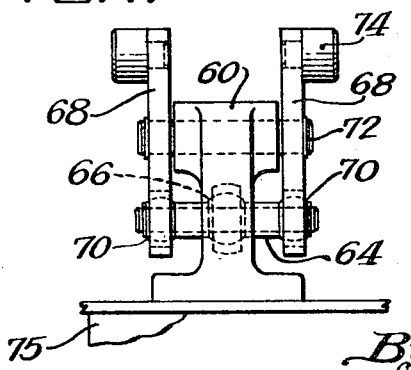
Inventors:
Charles A. L. Ruhl
Edward Mayer
Frederick M. Hugh
By John W. Haines
Atty.

Inventors:
Charles A. L. Ruhl
Edward Mayer
Frederick M. Hugh
By John W. Gaines
Atty.

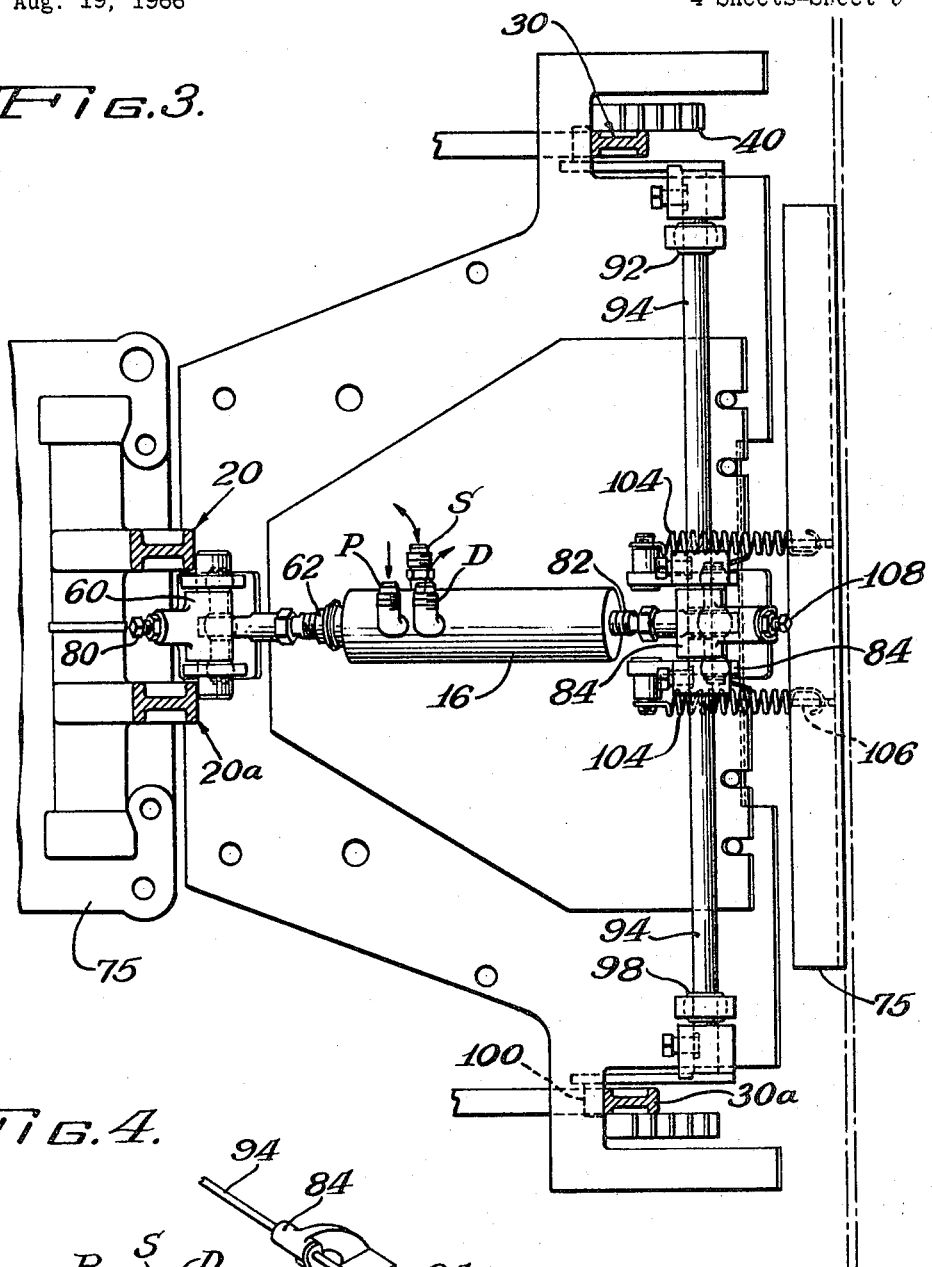
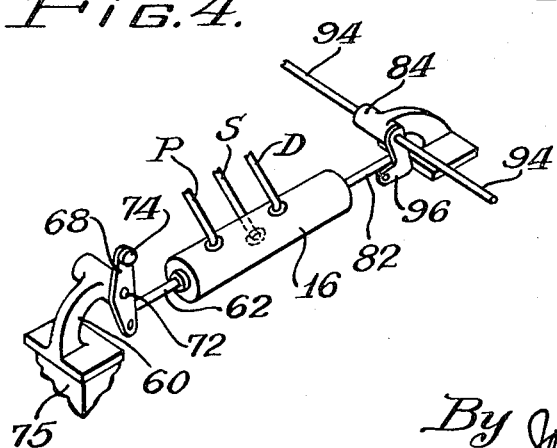

Inventors:
Charles A. L. Ruhl
Edward Mayer
Frederick M. Hugh
By John W. Gaines
Atty.

United States Patent Office 3,398,819
Patented Aug. 27, 1968

3,398,819
MAIN CLUTCH RELEASED BY ENGAGEMENT OF STEERING CLUTCH AND BRAKE
Charles A. L. Ruhl, Wheaton, Edward Mayer, Riverside, and Frederick M. Hugh, Mount Prospect, Ill., assignors to International Harvester Company, Chicago, Ill., a corporation of Delaware
Filed Aug. 19, 1966, Ser. No. 573,700
22 Claims. (Cl. 192—4)

In a main-clutch-activated, tractor propulsion power train as controlled by our brake responsive, main clutch release, and as generally indicated at 10 in FIGURE 1 of the accompanying drawings, the automatic controls 12 for the train 10 have a novel coaction effective only for releasing the main clutch 14 in the train when a steering clutch 28 and a steering brake 38 are engaged, and the controls 12 otherwise condition the main clutch 14 to assume its normal position of engagement.

In other words, the steering clutch and brake 28 and 38 are control parameters so arranged, when the steering clutch is engaged, that engagement of the brake causes the main clutch 14 to disengage, whereas disengagement of the steering brake causes the main clutch to re-engage; thus for all practical purposes we eliminate clutch-and-brake fight, and therein lies an important technical advantage of our invention.

Similarly when the brake is engaged, engagement of the steering clutch causes the main clutch to disengage whereas disengagement of the steering clutch causes the main clutch to re-engage; this latter action, responsive to engagement-disengagement of the steering clutch, is an inherency of the system and in most cases is of no technical advantage in practice.

TRAIN TERMINOLOGY

The main clutch is merely a readily understood term of convenience which we use in no limiting sense herein, broadly meaning any device 14 released by our control and constituted by either a transmission, or clutch means, or other deactivatable coupling between an engine and a transmission output; at all events, the device functions as the engageable means in a power train, which is deactivatable therein to disconnect the power train just the same as accomplished by a neutralized transmission, disengaged clutch means, deactivated coupling, etc.

The term steering clutch, being singular in form and yet indicated by the intended generic designation 28, means either or both steering clutches in the present steered-by-driving vehicle. Similarly, the term steering brake, generically designated 38, means either or both steering brakes.

AUTOMATIC CONTROL—FIGURES 1 TO 4, 8

At the heart of the system, a simple valve forms a central automatic control device 16 which, although it is strategically and conveniently placed in the vehicle, does not interfere with a standard tractor arrangement and causes no disruption in, or major revision of, existing parts.

The importance is apparent. Installing our system in a tractor materially reduces brake wear by practically eliminating an undesirable practice on the part of the driver. The undesirable practice is to "ride" the brake when the power train is under torque, which is a strenuous procedure sometimes resorted to in the common, low-speed situation requiring temporarily "inching" a tractor ahead. And as indicated in connection with the provision and installation of our central control 16, comparatively little change is necessary to standard brake-and-clutch steering mechanism.

MANUAL CONTROLS—FIGURES 1 TO 3

In the manual controls, which include a pair of standard clutch steering handles or levers, each such clutch lever, to which the generic designation 20 is applied in FIGURES 2 and 3, is connected in a mechanical path leading from the lever 20, through a connection 22, a linkage 24, a terminal connection 26 (FIGURE 1), and thence to a cylinder or fork for operating the steering clutch 28. For differentiation purposes, the right clutch lever bears the specific designation 20a and the right steering clutch bears the specific designation 28a.

Each of the two standard brake levers or pedals, the generic designation 30 being applied thereto, is connected in a mechanical path leading from the pedal 30, through a connection 32, a linkage 34, a terminal connection 36, and thence to a cylinder or fork for operating the steering brake 38. The right brake pedal only has the specific designation 30a and the right steering brake only has the specific designation 38a. Each brake pedal carries a ratchet sector 40 which cooperates with a ratchet, not shown, for releasably locking the brake in engaged position.

Brake and clutch return springs, e.g., brake spring 41 (FIGURE 2), are provided in conventional fashion and several such springs are illustrated in FIGURES 1 and 2.

POWER TRAIN—FIGURE 1

Axle input power or torque follows a path leading from an engine 42 in the vehicle, through a hydrodynamic torque converter 44, the main clutch 14, a manual shift gear box 46, a set of bevel gearing 48, and thence to a transverse axle 50 at the rear of the vehicle. Tractive output power which is transmitted outwardly in opposite directions by the axle 50 follows paths through the steering mechanism 28, 38 at each side, bull gearing 52 in the final drive, a sprocket 54, and thence to the tracks 56 and 58 carried at the respective left and right sides of the vehicle. A seat 58 for the driver is at the rear and approximately at the center of the vehicle.

In the case of making a pivoting turn about the right track 58, for example, irrespective of whether the vehicle is moving forwardly or rearwardly, the operator disengages the right clutch 28a and engages the right steering brake 38a less or more and executes less or more of a drastic turn. A turn forwardly or rearwardly of the same character, but slower, is accomplished by full release or some degree of partial release of the clutch 28a so as to deprive the track 58 of full torque whereby ground reaction will slow it down. It is apparent that turns by slow-down or stopping of the opposite track are similarly accomplished.

VALVE MECHANISM—FIGURES 2, 3, 4, 5, 6, 7

For purposes of automatic operation of the central control device 16, an interposed lever linkage forms the valve operating mechanism at the rear comprising a fixed upstanding gooseneck 60, a lever-connected, valve spool part 62, a first positioning bar 64, a ball joint 66 (FIGURE 2) universally attaching the valve spool part 62 to the bar 64 intermediate the ends thereof, a supporting reversing link 68 adjacent each clutch lever, a ball joint 70 at each end of the positioning bar 64 connecting that end of the bar to the lower end of the adjacent supporting link 68, a pivot shaft 72 whereby the gooseneck 60 pivotally supports the midportion of each supporting link 68, and a roller 74 carried by the upstanding end of each supporting link 68 and anti-frictionally connecting the link at the end to the adjacent reaction surface at the front of the clutch lever 20 at that end. The tractor has floor-supporting structure 75 carried by the body frame. An adjustable stop 76 carried by the floor-supporting structure 75 engages a projecting front lug 78 adjacent the hub of the clutch lever handle 20 to limit forward movement of the same. An adjustable stop 80 carried by the fixed gooseneck 60 engages the lever-connected spool part 62 of the device 16 to limit rearward movement of the same.

Figure 5:
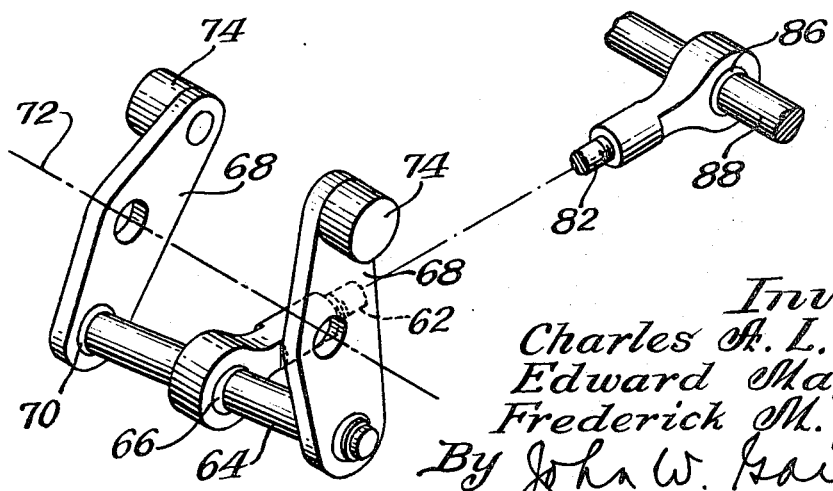

At the front, an interposed pedal linkage connects a pedal-connected valve body part 82 of the device 16 to the brake pedals in a path including a fixed upstanding gooseneck 84 on the supporting structure 75, a ball joint 86 (FIGURES 5 and 6) connecting the part 82 to a second positioning bar 88 intermediate the ends thereof, a supporting bellcrank link 90 (FIGURE 6) at each end of the positioning bar 88 and each having its swinging body connected by a ball joint 92 to that end of the positioning bar 88, oppositely extending torque transferring shafts 94 each journaled at the inner end in an individual bearing bore on the gooseneck 84 and each being fast at that end to a vertical arm 96 on the bellcrank, outer-end pedestals each connected by a ball joint 98 to support the outer end of the adjacent shaft 94, and crank-carried pins 100 respectively fast to the just said ends of the torque transferring shafts 94 and forced by the pressure of the shafts against the rear surface of the adjacent pedals 30. The torque pressure of the shaft causes each crank pin 100 to follow the pedal when the pedal 30 is displaced forwardly, thus accommodating attendant rotation of the shaft 94 counterclockwise as viewed in FIGURE 2.

More specifically, each crank-carried pin 100 and the body of the associated bellcrank 90 produce such action because they are constantly biased forwardly by a helical spring 104 connected at one end to a horizontal arm 102 (FIGURE 2) on the bellcrank and connected at the opposite end to a fixed bracket 106 carried on the supporting structure 75 of the body frame. The strength, amount and direction of travel, and leverage of the two springs 104 are of small consequence compared to the brake return springs, e.g., spring 41, yet the force of the brake springs is increased somewhat, as a counter action to keep the right feel of resistance in the brakes. An adjustable stop 108 which is threaded to the gooseneck 84 engages the forward end of the lever-connected part 82 to limit the extreme forward travel of that part of the device 16.

DEVICE 16: POSITIONS AND OPERATION

The device 16 is an hydraulic valve with two pilot positions, a foreshortened position for pressurizing a clutch and an extended or drain position for draining it to declutch. The lever-connected part 62 of the device is a spool and the pedal-connected part 82 at the front is a cylindrical valve body slidably receiving the spool. Two top connections to the body are designated P and D in abbreviation of their respective pressure and drain functions. A side connection forms a third connection and is designated S in abbreviation of its service line function upon the valve body.

When the device 16 is foreshortened, the lever-connected spool part 62 is in a depressed position providing a port to-groove to-port communication through the valve body and interconnecting the P and S connections for clutching. When the device 16 is extended, the lever-connected spool part 62 partly withdraws providing a port to-groove to-longitudinal-passage to-groove to-port communication, not shown, in the valve body interconnecting the S and D connections to declutch. A coil spring 110 (FIGURE 2) biases the spool part 62 continuously toward the depressed position so as to foreshorten the device 16, and is within the valve body in surrounding relation to the forward end of the spool part 62.

The links 68 as indicated are reversing supporting links at the rear of the device 16 so that, when the device 16 is displaced forwardly, the lever-connected spool part 62 and the first positioning bar 64 can accommodate to the motion by similarly moving forwardly whenever either or both clutch levers 20 have the retracted, declutched broken line positions indicated by the broken lines DC in FIGURE 2. In other words, the levers 20 provide a retractible backstop normally taking the reaction from the spool part 62 and, when retracted from the latter, the spool part 62 and first positioning bar 64 are effective to move in a direction opposite from the pivoting levers 20.

The supporting links or bellcranks 96 enable the pedal-connected valve body part 82 and the second positioning bar 88 (FIGURE 6) to move in a common direction with the pivoting of either or both of the pedals 30 as they are depressed forwardly to the brake-applying position indicated by the broken lines BA in FIGURE 2. By depressing the brake lever 30 into the displaced position BA, the driver inherently displaces the device 16 forwardly.

So, if the levers are retained in their solid line backstop position 20 blocking movement of the reversing supporting links 68, the spring 110 in the device 16 is collapsed during braking and the valve parts in the device take their extended position for declutching. In order to reclutch, the driver either releases the brake pedals 30 from the brake-applying position BA or retracts the clutch levers 20 into the broken line position DC, or does both things. The valve parts thereby resume undisplaced or foreshortened position for clutching.

CLUTCH AND PILOT CIRCUIT—FIGURES 1 AND 8

A driver controlled range selector valve 112 has ports at three positions identified R, N, and F, in abbreviation of the respective reverse, neutral, and forward function of the main clutch 14, hereinafter referred to as the directional clutch pack. Preferably in practice it comprises the attendant gearing, plus forward and reverse clutches. A conduit 114 leads from the R port position on the valve 112, through a two-position, pilot operated, reverse slave valve 116 to the reverse clutch in the directional clutch pack 14. A conduit 118 leads from a F port position on the valve 112, through a two-position pilot operated, forward slave valve 120 to the forward clutch in the pack 14. Drain lines from the valves 116 and 120 and a drain line from a port in the N port position of the valve 112 meet in a three-way drain junction 122.

Figure 8:
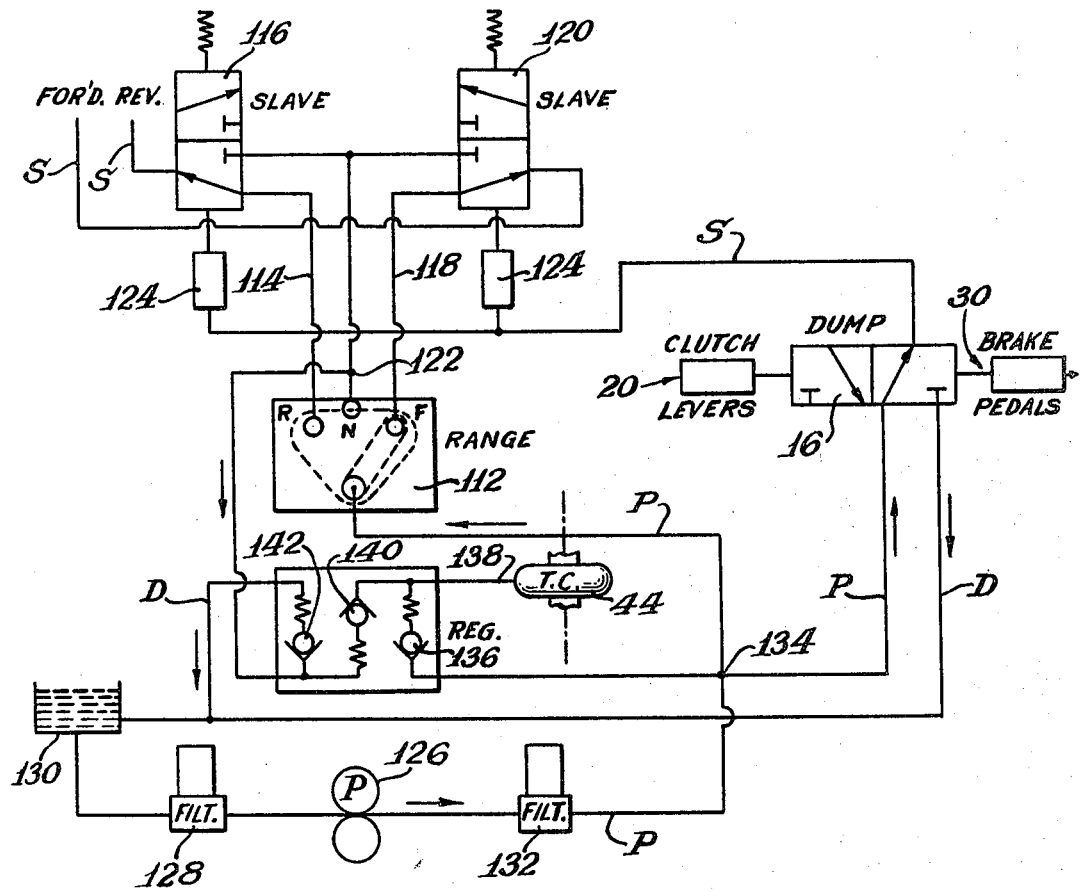

The device 16 receives a supply of fluid and pilots the valves 116 and 120 through a conduit designated S in abbreviation of its service function. Pressure in the conduit S causes simultaneous operation of a pair of piloting cylinders 124, thus causing the valves 116 and 120 to take the upwardly displaced position shown in FIGURE 8. Whichever clutch in the pack 14 happens to be selected by the range valve 112 is thereupon pressurized and clutches.

On the other hand, displacement of the valve parts of the device 16 blocks the piloting cylinders 124 from pressure and connects them to drain. The slave valves 116 and 120 are retracted downwardly from the position shown in FIGURE 8, so as to block the clutches in the pack 14 from the range valve 12 and so as to connect the clutches both to drain. The pack 14 therefore disengages irrespective of the operative setting of the range valve 112.

FLUID SUPPLY

The fluid supply will now be described. A pump 126 driven by the engine, not shown, in the vehicle, draws fluid through a filter 128 from a fluid reservoir 130. The pump discharges the fluid through a filter 132 to a three-way pressure junction 134. The conduits leading from the junction 134 are designated P in abbreviation of their pressure purpose. A high-pressure valve 136 in a regulator valve assembly opens in response to a pressure above the high pressure desired and allows flow from the junction 134 to the torque converter 44 through a conduit 138.

An intermediate pressure valve 140 opens in response to a pressure above the intermediate pressure desired and allows fluid to join with fluid from the drain junction 122, whereupon the dual flow enters into one of the lines designated D, in abbreviation of the drain function. A low-pressure valve 142 in the regulator valve assembly can be interposed ahead of the D line, the function being to open when the pressure exceeds the predetermined value of low pressure desired and to allow the flow into the drain line D. All drain lines D empty into the reservoir 130.

UNMODIFIED OPERATION

The device 16 is without influence to modify operation of the tractor under most circumstances. One or both clutch levers 20 are moved to the declutched position DC for selectively discontinuing the final drive in order to steer or to slow down the tractor in the regular way. While final drive power is so removed, the brake pedals 30 can be depressed for steering or stopping purposes in the regular way.

Moreover, the clutch pack 14 is conventionally neutralized by moving the range valve 112 into the N port position, and thus the engine 42 can be independently operated without causing tractor movement.

MODIFIED OPERATION

Upon co-engagement of the steering clutch 28 and the steering brake 38, as evidenced by the clutch lever 20 having the advanced, unpivoted position shown in solid lines in FIGURE 2 and the brake pedal 30 having the advanced, pivoted position shown by the broken lines BA in FIGURE 2, the clutch pack 14 is neutralized because the parts of the device 16 are displaced as follows. The hand lever 20 in its unpivoted position blocks the interposed lever linkage from moving, whereas the pedal-connected valve body part 82 is displaced in the direction of pivoting of the pedal in assuming the brake applied position.

On the other hand, the spring 110 in the device restores it into the foreshortened operating position whenever either the steering clutch 28 or steering brake 38 is disengaged, thus reclutching the pack 14 in the setting therein selected by the range valve 112. That is to say, retraction of the pedal 30 into the unpivoted position as shown in solid lines in FIGURE 2 or retraction of the clutch lever 20 into the pivoted broken line position DC causes the selected clutch in the clutch pack 14 to re-engage.

From the foregoing, it is appreciated that "inching" of the tractor is readily and efficiently accomplished without disturbing the range valve 112 from any operating setting and without disturbing the clutch levers from their operating position as shown in solid lines. During a partial or full degree of depression of the brake pedals 30, the appropriate tracks 56 or 58 are braked to that degree and at the same time the clutch pack 14 interrupts the application of power to the tracks. Hence, the tractor can be slowly braked or immediately braked to a stop, and the inching can be continued in that fashion either in a straight direction fore or aft by releasing both brake pedals or in a turning direction by releasing only one brake pedal.

One make of ball joint found satisfactory is a Heim Unibal joint and the strategic location of these joints on the first and second positioning bars 64 and 88 allows the single device 16 to serve in common to the four levers consisting of clutch levers and brake pedals. Pivoting of either clutch lever effectively removes the backstop from the device 16 and pivoting of either brake pedal causes the pedal-connected part 82 of the device 16 to move forwardly. The positioning bars cock in accommodating under these circumstances, but not necessarily so for the reason that simultaneous pivoting of the clutch levers will allow the ends of bar 64 to move in the same direction and simultaneous pivoting of the brake pedals will allow the ends of the bar 88 to move in the same direction.

From the foregoing, it is apparent that the device 16, which operates on a piloting principle, is merely a variant of a dumping valve, which in the more common form would be series-connected with, and upstream of, the range valve 112 for controlling whether activating pressure or dumping pressure is applied to the selected clutch whereby to engage the clutch or not. As actually illustrated, however, the valve device 16 is connected hydraulically in parallel relation with, and at a junction point 134 beginning upstream of, the series-connected range selector valve and the slave valves.

What is claimed is:

1. In the propulsion power train of a vehicle leading from the vehicle engine, and including a steering clutch and brake, and further including main clutch means coupled in the train between the engine and the steering brake and clutch:
    individual controls for the respective main and steering clutches and said brakes, including a main clutch release control; and
    means of interconnection among the controls effective only for releasing the main clutch means when the steering clutch and brake are engaged, and for otherwise sustaining the main clutch means in a normal position of engagement.

2. The invention of claim 1, characterized by said means of interconnection being mechanically connected to the steering brake and clutch, and being hydraulically connected to the main clutch.

3. The invention of claim 2, the main clutch means (14) characterized by directional clutches having normal forward and rear positions of engagement.

4. The invention of claim 2, characterized by the control for the steering clutch being manually operated and comprising a handle (20), the control for said brake being manually operated and comprising a pedal (30), and the main clutch control being hydraulically operated and automatic.

5. In a power transmission including a vehicle brake, main and steering clutches, and hand and pedal levers connected for setting the respective steering clutch and brake in engaged or released position:
    a device (16) for setting the main clutch in engaged or released position;
    means (74) variable with the position of the hand lever;
    means (100) variable with the position of the pedal lever; and
    means (68, 90) controlled by the first two means and connected for imparting a displacement to said device that varies co-ordinately with corresponding changes in position of the steering clutch and vehicle brake.

6. The invention of claim 5, characterized by said main clutch having an engaged position attained by activating pressure which, when dumped, releases the clutch;
    there being an activating pressure, control line including said device therein, said device comprising a dump valve device displaceable in accordance with the displacement described for dumping the activating pressure from said control line and releasing the main clutch.

7. The invention of claim 6, characterized by the three said means being constructed and arranged whereby the valve displacement to dump position is accomplished only upon co-engagement of the steering clutch and brake.

8. The invention of claim 7, characterized by the levers pivoting into remote positions from their mutually adjacent, unpivoted position, said third means (68, 90) being constructed and arranged for imparting displacement to the valve device only when one of the levers is in the pivoted position.

9. The invention of claim 8, the third means characterized by linkage means in which said valve device (16) is interposed and which is operatively disposed between the levers;

said hand lever (20) in its unpivoted position forming a backstop taking the direct reaction from a connection (74) to said linkage means when the dump valve device has one end displaced relative to its reaction end;

the displaced end of said valve device having an operative connection (100) to the pedal lever through a part of said linkage means whereby the device is displaced with, and in the direction of pivoting of, the pedal lever.

10. The invention of claim 9, said linkage means being characterized by the displaced end (82) of the valve device moving in the direction of pivoting of the pedal lever, said linkage means including a reversing link (68) at the reaction end of the valve device whereby the reaction end moves in a direction generally opposite to pivoting of the hand lever.

11. In a transmission-powered crawler vehicle equipped with steering brake and clutch elements, and at least one main clutch, the combination with said equipment, of:

hand and pedal levers connected respectively to the steering clutch and brake elements;

a main clutch control communicating with the main clutch comprising interposed clutch dump valve means displaceable to control said clutch;

said levers being in an operative relation and with the dump valve means connected therebetween, so as to displace the valve means for releasing the main clutch when the levers are in a position setting the said two steering elements in engaged position, or to hold the valve means undisplaced for sustaining main clutch engagement when the levers are in a position setting one particular element in released position; and means for supporting the levers and valve means in the operative relationship described.

12. The invention of claim 11, the main clutch control in said combination further characterized by a range selector valve (112) overcontrolled by the clutch dump valve means and having means of hydraulic inter-relationship therewith to control the main clutch.

13. The invention of claim 12, characterized by the clutch dump valve means comprising a pilot dump valve and two slave dump valves;

there being two main clutches consisting of forward and reverse clutches engageable to provide forward and rear power paths through the vehicle transmission and connected each to the range selector valve through a different one of the slave dump valves;

the inter-relating means of the range valve with the clutch dump valve means comprising means (124) whereby the pilot valve overcontrols the range valve by setting the slave valves (116, 120) in a clutch dump position.

14. The invention of claim 13, the last said means characterized by piloting cylinder means for positioning the slave valves, and a pilot line (S) hydraulically interconnecting the pilot cylinder means and the pilot valve; and means (134) for conducting activating pressure fluid to the range valve and to the pilot valve;

said forward and reverse clutches effectively responding to activating pressure or effectively dumping through the slave valves when the piloting cylinder means are subjected by the pilot valve to activating pressure or dumping, said piloting cylinder means being subjected to activating pressure or to dumping pressure through the pilot valve in response to the relative positions of the hand and pedal levers.

15. The invention of claim 14, characterized by the range valve having a rear and a forward position, and further having a neutral port position (N) for dumping the forward and reverse clutches.

16. In a steered-by-driving vehicle comprising a separate steering and a separate braking means on each of two drive shafts at opposite sides of the vehicle, a prime mover having engageable means in a power train effective or ineffective for applying the power train power or not to said drive shafts, and spaced-apart operator-operated members having motion of relative separation:

the improvement wherein said separable members comprise an individual brake pedal for each of the braking means, and an individual clutch lever for each of the steering means on said shafts;

a flow line (P to S) for connecting the engageable means in the power train to a source of pressure to render the engageable means effective to apply power; and valve mechanism connected to said line including a pedal-connected part and a lever-connected part, responsive respectively to a brake pedal and to a clutch lever;

said pedal-connected part disposing the valve parts in a relatively displaced position closing said line when the brake pedal undergoes separable movement, rendering the engageable means ineffective in the power train, said valve mechanism holding the valve parts in a relatively undisplaced position opening said line when both the pedal and lever undergo separable movement, sustaining the engageable means so that the power train is effective to apply power.

17. The invention of claim 16, characterized by said clutch levers and said brake pedals being separable by individually pivoting from a mutually adjacent unpivoted position;

the lever-connected part and the levers having an interposed lever linkage (68) enabling the levers to act as a backstop taking the reaction from the lever-connected part, said lever-connected part when the valve mechanism is in the displaced position being effective to move in a direction opposite from the pivoting levers;

the pedal-connected part and the pedals having an interposed pedal linkage (90) whereby the pedal-connected part is effective to move in a common direction with the pivoting pedals.

18. The invention of claim 17, the interposed lever linkage characterized by a first positioning bar (64), said lever-connected part having means of attachment to the first bar intermediate the ends thereof, and two reversing supporting links disposed one at each end of the first bar and connecting the bar to the lever at that end.

19. The invention of claim 18, characterized by the interposed pedal linkage comprising a second positioning bar (88), said pedal-connected part having means of attachment to the second bar intermediate the ends thereof, and means including two supporting links disposed one at each end of the second bar and connecting the bar to the pedal at that end.

20. The invention of claim 19, characterized by said means of attachment to the first and second bars each including a ball joint accommodating universal movement between the bar and the connected part of the valve mechanism.

21. The invention of claim 19, characterized by ball joints at all of said connections to, and at all of said means of attachment to, said positioning bars.

22. The invention of claim 17, the interposed linkages characterized by rendering the pivoting of either pedal effective to hold the valve parts in the relatively displaced position, and thereafter rendering the pivoting of either lever effective to dispose valve parts in the relatively undisplaced position.

References Cited

UNITED STATES PATENTS

| | | | |
|---|---|---|---|
| 1,720,849 | 7/1929 | Menningen | 74—665 |
| 2,392,423 | 1/1946 | Stephens | 192—13 |
| 3,050,165 | 8/1962 | Day et al. | 192—4 |

BENJAMIN W. WYCHE III, *Primary Examiner.*